United States Patent [19]

Korfanta

[11] Patent Number: 4,885,847

[45] Date of Patent: Dec. 12, 1989

[54] GOLF CLUB MEASURING AND FITTING APPARATUS

[76] Inventor: Craig M. Korfanta, 203 E. Melrose, Boise, Id. 83706

[21] Appl. No.: 161,764

[22] Filed: Feb. 29, 1988

[51] Int. Cl.⁴ .............................................. G01B 5/00
[52] U.S. Cl. .................................................... 33/508
[58] Field of Search .......... 33/508; 273/183 D, 80 D, 273/80.1

[56] References Cited

U.S. PATENT DOCUMENTS

| | | | |
|---|---|---|---|
| 3,208,150 | 9/1965 | Rhodehamel | 33/508 |
| 3,350,101 | 10/1967 | Bishop et al. | 33/508 X |
| 4,104,802 | 8/1978 | Johnston | 33/508 |
| 4,655,457 | 4/1987 | Thompson | 33/508 X |

FOREIGN PATENT DOCUMENTS 0591840 8/1947 United Kingdom ................. 33/508

Primary Examiner—Harry N. Haroian
Attorney, Agent, or Firm—Frank J. Dykas; Craig M. Korfanta

[57] ABSTRACT

A lightweight, portable apparatus for measuring and custom fitting golf clubs to an individual golfer is provided. A lengthwise adjustable club shaft pivotally mounted on a base plate includes a protractor-type scale at the pivot point to set the desired lie angle and a linear scale marked on the shaft to indicate the length of the shaft. Once the desired lie angle and shaft length are determined, the address distance is measured and marked on the shaft of the custom golf club thus obtained.

9 Claims, 2 Drawing Sheets

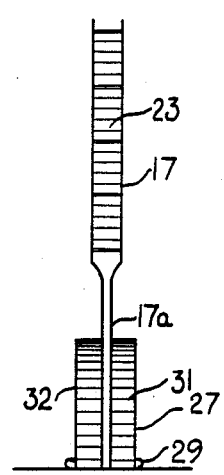
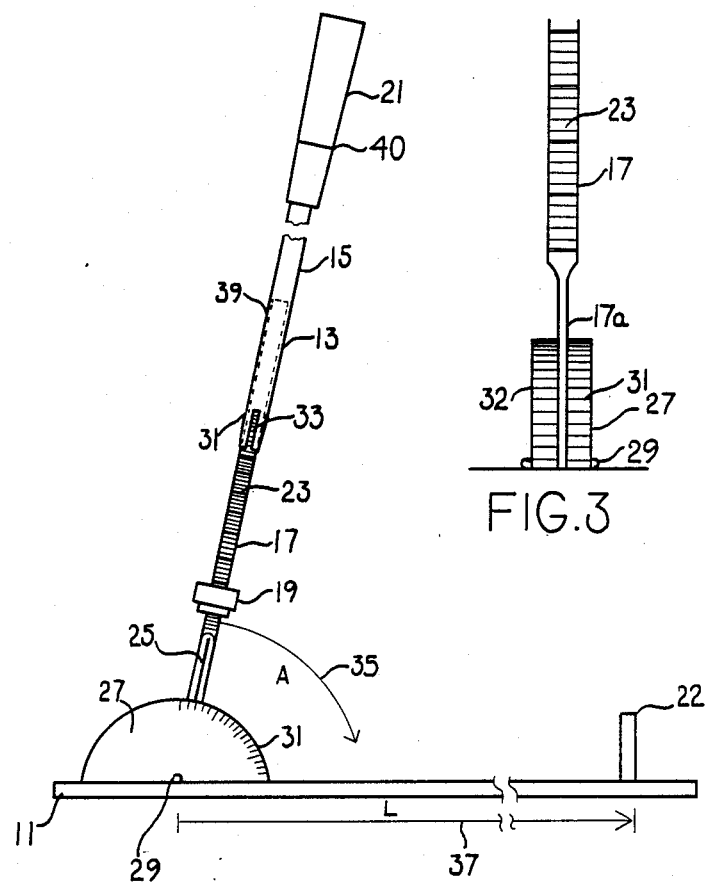
FIG.2
FIG.3

GOLF CLUB MEASURING AND FITTING APPARATUS

BACKGROUND OF THE INVENTION

1. Technical Field

The present invention relates generally to apparatus for the custom fitting of golf clubs to golfers, and, more particularly to apparatus for adjusting the lie angle and the club length and measuring the corresponding address distance of golf clubs for an individual golfer.

2. Background Art

It is well-known that a large percentage of golfers play with incorrectly-fitted or ill-fitting golf clubs. Primarily, this results because a standard set of golf clubs, 1-4 woods and 2-9 irons, for example, are manufactured to specifications determined by a "standard golfer". However, since golfers vary considerably in height, arm length and stance when addressing the golf ball, even men of the same height may have different arm and torso lengths, golfers commonly select golf clubs by trying a large number of clubs to determine which "feels" the most appropriate considering their physical makeup. Further, many of the better sets of golf clubs are not uniformly graduated from one club to the next within the set thus preventing the golfer from achieving uniformity of practice.

Each golf club has three angles associated with it: open club face angle, loft angle and lie angle. The loft angle is the angle of the striking face of a golf club head relative to a vertical axis passing through the center of the golf ball and has a critical effect on the trajectory of a golf ball when hit with the club. The lie angle is the angle of the major axis of the club shaft with respect to the horizontal plane and any error in the lie angle also has a critical effect on the trajectory of the golf ball. To avoid hooking or slicing the golf ball, the club must impact the golf ball so as to impart rotation to the ball in a direction parallel to the direction of intended travel of the ball. If the golf club is not properly oriented at the instant of impact, with the proper loft angle and lie angle, the direction of the rotation imparted to the ball may not be parallel to the intended path of travel and the resulting lift will have a horizontal vector component causing the ball to fly to the left or right of the intended path of travel. Assuming that the loft angle is correct, i.e., the golf club is oriented in the proper vertical plane, any error in the lie angle results in the golf ball being impacted at an incorrect angle. The lie angle at impact, called the effective lie angle, is a function of the lie angle built into the club and the dynamic force associated with the swinging motion.

When the golf club is held by the golfer at the correct effective lie angle, the club shaft length, which is the distance to the impact point on the club face from the lowest point of contact of the golfer's hand with the golf club's grip, is related to the address distance, i.e., the distance that the golfer stands from the tee when the ball is addressed. The measured address distance is actually the sum of two separate distances. The first is the product of the club shaft length and the cosine of the effective lie angle. The second distance is a unique distance associated with an individual address stance that is added to the first distance to obtain the measured address distance. To insure that the golf club is held at the correct effective lie angle, the golfer has to be positioned at the address distance corresponding to the club length and effective lie angle. U.S. Pat. No. 4,655,457 entitled "System to Fit Golf Club to Golfer" issued to Stanley G. Thompson on Apr. 7, 1987, discloses apparatus to measure the loft angle, lie angle and proper shaft length to custom fit a golf club to a golfer. However, even if the golf club shaft is of the proper length for a golfer's height and stance, if the golfer does not consistently address the golf ball at the proper address distance, there will be an error in the lie angle resulting in an incorrectly hit ball.

It is an object of the present invention to provide an apparatus which easily and accurately measures the shaft length and the address distance corresponding to the effective lie angle to facilitate custom fitting a golf club to a golfer.

Another object of the present invention is to provide apparatus for custom fitting of a golf club to an individual golfer which is simple to construct, lightweight and portable and which requires little skill to use.

An additional object of the present invention which is not taught in any prior art, is a unique method for fitting a number of clubs from a single set of measurements which results in the golfer being able to use a consistent stance for any number of fitted clubs with different lengths and associated lie and loft angles.

DISCLOSURE OF INVENTION

A golf club measuring and fitting device constructed in accordance with the principles of the present invention comprises a raised, flat base; an upwardly and backwardly extending, adjustable club shaft pivotally attached to the flat base near its front edge; and an adjustable toe plate slidably mounted on the flat base in a slot aligned fore and aft with the adjustable club shaft. The base is mounted on adjustable legs positioned at each corner thereof to facilitate leveling the base. The club shaft is adjustable both in length and angle relative to the base and includes a conventional shaft grip at its upper end which has a grip mark located approximately one-third of the distance up the grip from the bottom of the grip. The lower end of the club shaft is pivotally attached to the base by a pivot bolt and includes a marker to indicate the angle of inclination of the shaft with respect to the base as read from a protractor mounted on the base. The lower portion of the club shaft is marked with a linear scale to indicate the length of the club shaft once adjusted. The adjustable toe plate is aligned with the inclined club shaft and includes a suitable scale to facilitate measuring the address distance when the club shaft length is properly set.

To fit a golf club to an individual golfer, the adjustable club shaft is rotated about the pivot bolt and set at the proper lie angle. The golfer then steps onto the base, grips the grip so the lowest point of contact of the golfer's hand corresponds with the grip mark located on the grip, and addresses the ball at the normal address distance and stance corresponding to the golfer's height and other physical characteristics. The club shaft is then adjusted to the proper length for the golfer and measured. The golfer's address distance is then measured by adjusting the toe plate against the golfer's toes and reading the distance from the scale. The club shaft is then cut to a length which enables the grip mark to be positioned at the measured shaft length distance from the impact point on the club face. The grip mark is located approximately one-third of the way up the grip. The address distance is then marked on the custom fitted golf club shaft to enable the golfer to always use the correct address distance for that club while playing.

Using this apparatus and method any number of golf clubs can be fit by using a series of measurement sets, one for each club.

A second method to fit a number of clubs for a particular golfer from a single set of measurements is accomplished using the same method as above. The shaft lengths and address distances can be calculated using the effective lie angle of each club. The shaft is then cut and fitted with a grip, which has a grip mark installed approximately one-third its total length from the bottom of the grip, so the grip mark is located at a distance from the impact point on the club face which is equal to the calculated shaft length. The calculated address distance is then marked on the custom fitted golf club for reference by the golfer.

BRIEF DESCRIPTION OF THE DRAWINGS

FIG. 2 is a side elevation view of the golf club measuring and fitting device shown in FIG. 1.

FIG. 3 is a partial view from the front or back of the lower shaft section of the adjustable club shaft shown in FIG. 1.

BEST MODE FOR CARRYING OUT INVENTION

Figure 1:
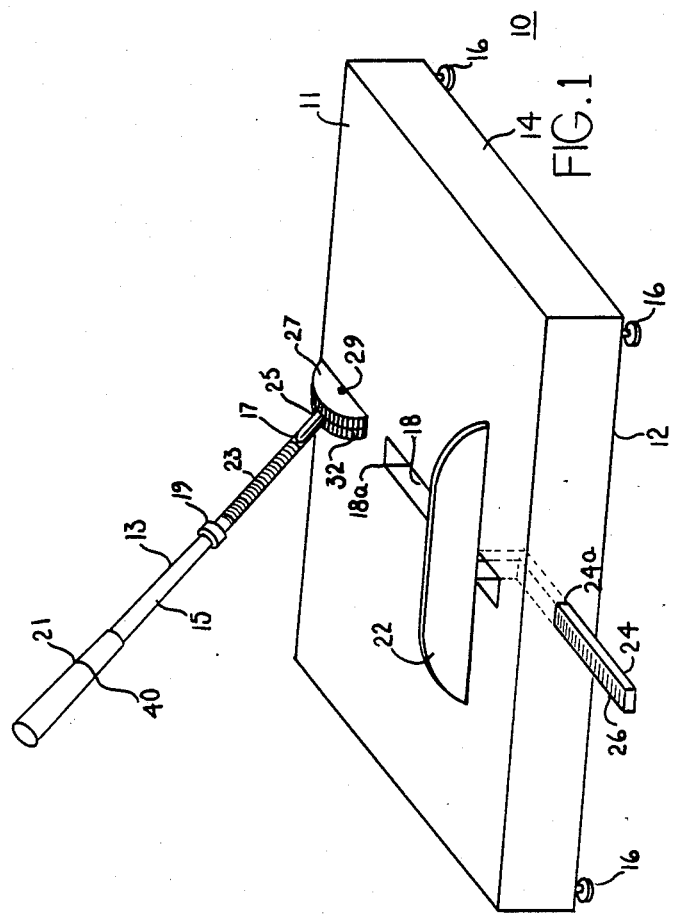
FIG. 1 is a perspective view of a golf club measuring and fitting device in accordance with the principles of the present invention.

Referring now to the drawings, and to FIG. 1 in particular, apparatus for measuring and custom fitting a golf club to an individual golfer is designated generally 10 and includes a flat, rectangular base 11, a two-part tubular adjustable club shaft 13 and a slidably adjustable toe plate 22. Flat base 11 comprises a support frame (not shown) enclosed by sides 14 and front (not shown) and back sides 12 to provide strength and rigidity and to support a rectangular base 11. Base 11 is mounted on adjustable legs 16 located at each corner which allows the base to be leveled. The rectangle base 11 is constructed from wood or light metal such as aluminum. The top surface of base 11 may be covered with indoor/outdoor carpet or synthetic grass if desired. Toe plate 22 is slidably mounted in slot 18 by handle 24 attached to the lower edge of toe plate 22 and extending through and under top surface 11 horizontally through opening 24a in back side 12. Slot 22 is disposed transversely front to back in the top surface 11 and is aligned with the vertical plane in which the club shaft 13 is oriented.

Referring now also to FIGS. 2 and 3, a pair of identical, semicircular plates having their circular edges bent at a ninety degree angle to form a peripheral edge are disposed in facing relationship to form a housing 27 mounted at the front edge of base 11 and aligned with transverse slot 18. Housing 27 has a slot 32 (as shown in FIG. 3) to receive the lower end 17 of club shaft 13. Pivot bolt 29, mounted transversely through the lower portion of housing 27, pivotally mounts club shaft 13 to the base 11 and allows club shaft 13 to be set at any desired angle A (as indicated by curved arrow 35) with respect to base 11. Housing 27 has a protractor scale 31 inscribed along at least a portion of its semicircular upper edge (or angular indicia 31 inscribed on its peripheral edge as shown in FIG. 2). A hair line 25 aligned with the axis of club shaft 13 is inscribed on the lower portion of lower club shaft 17 to be aligned with the graduations of scale 31 indicates the lie angle A (as indicated by double-ended curved arrow 35). Once the desired lie angle A is set, the pivot bolt 29 may be hand-tightened, as with a wing nut or the like, to securely hold the club shaft 13 at the desired lie angle.

Tubular club shaft 13 comprises a lower shaft section 17 and an upper shaft section 15 which is of slightly larger diameter than the lower shaft section 17 and has a conventional golf club handle grip 21, which has a reference mark 40, secured at its upper end. The lower shaft section 17 includes an upper portion which fits slidably into the lower portion of the upper shaft section 15 and which protrudes from the lower end thereof. Bushing 39 prevents any transverse movement of lower shaft section 17 with respect to upper shaft section 15 and maintains axial alignment of the upper and lower shaft sections. A hand-tightened nut 19 is slidably mounted on the exposed lower section 17 below the threaded and bevelled lower end of upper tubular section 15. This threaded end of upper tubular section 15 further has slots 33 formed therein and evenly spaced about the circumference of threaded lower end of upper tubular section 15. When nut 19 is threadedly engaged and tightened on the threaded lower end of tubular section 15, the lower end is compressed against the outer surface of lower shaft section 17 and retains club shaft sections 15 and 17 in selected adjusted positions, with the lower shaft section 17 extending to any desired distance relative to the upper shaft section 15 to form a club shaft of any desired length. Lower shaft section 17 includes inscribed linear graduations 23 which are utilized to determine the length of the adjusted club shaft.

The lower shaft section 17 includes a lower blade section 17a where the tubular shaft has been flattened to form a blade to be inserted in slot 32 in housing 27. Blade section 17a has a hole (not shown) drilled through the lower end for receiving pivot bolt 29.

To utilize the golf club measuring and fitting device 10, slide the toe plate 22 to the front end 18a of slot 18 to a minimum distance from the pivot pin 29 and loosen both the pivot bolt 29 and nut 19. The individual golfer being fitted then steps upon the top surface of base 11 and addresses the ball (the ball is assumed to be at the location of the pivot bolt 29) with his or her normal stance. The club shaft 13 is now rotated about pivot bolt 29 to the effective lie angle A as indicated by hairline 25 in cooperation with protractor scale 31 and the pivot bolt 29 is tightened to maintain the club shaft at the desired lie angle. The length of the club shaft 13 is then adjusted to best accommodate it to the golfer who is holding the club shaft by the handle grip 21 in the same manner that he or she would hold a golf club preparatory to striking a golf ball. When the shaft length has thus been adjusted to best suit the height, arm length and general posture of the player, nut 19 is tightened to clamp the upper and lower shaft sections 15 and 17 at the desired length. During the club shaft 13 length adjusting process, some repositioning of the golfer's feet or adjustment of the golfer's address distance L, as shown by double-ended arrow 37, may be necessary to get the best fit. The final step is to slide the toe plate 22 back from the end 18a of slot 18 until it contacts the golfer's feet. The toe plate handle 24 is provided with a graduated linear scale 26, or one may use a yardstick or other suitable device, to measure the address distance L for the particular golf club measurements thus determined. The linear and angular measurements thus obtained can now be utilized to custom make clubs best suited to the individual golfer's needs. The shaft on the golf club is then cut so that when fitted with handle grip 21, the reference mark 40 is located at a distance from the impact point on the club face which is equal to the measured club length. The address distance obtained for each set of measurements is marked on the shaft of the golf club corresponding to that set of measurements so the golfer is assured of using the proper address distance for each golf club used during play.

A second method of custom fitting a plurality of golf clubs using the golf club measuring and fitting device 10, is based a constant hand height. The hand height is hereinafter defined as the distance from the grip mark 40, to a point on the ground or top surface of base 11 located directly below the grip mark 40. The second fitting method is the same as the first with the exception of fixing the effective lie angle A. The club shaft 13 is allowed to rotate about pivot bolt 29. A set of reference measurements is obtained by reading and noting scales 23, 26, and 31. The hand height is determined by taking a direct measurement using a standard measuring means or by calculating the hand height mathematically.

To calculate the hand height one simply multiplies the shaft length by the sine of the effective lie angle A, both of which are reference measurements. A second address distance is calculated and obtained by multiplying the reference shaft length by the cosine of the reference effective lie angle A. An address fitting constant is obtained which is the difference between the measured address distance L and the calculated address distance.

The individual parameters, shaft length and address distance, of the golf clubs to be fitted can be calculated using the address fitting constant, hand height, and each club's effective lie angle. The shaft length is equal to the hand height divided by the sine of the effective lie angle. The address distance is equal to the sum of the address fitting constant and the quotient of the hand height divided by the tangent of the effective lie angle. The club is now cut, griped and marked as before.

Fitting an entire set of golf clubs using the second method, called the constant hand height method, results in the golfer being able to maintain a consistent address stance regardless of which custom fitted club he is using.

While there is shown and described the present preferred embodiment of the invention, it is to be distinctly understood that this invention is not limited thereto but may be variously embodied to practice within the scope of the following claims.

I claim:

1. Apparatus for measuring and fitting a golf club to a particular golfer comprising:
   a flat base;
   an elongated shaft having a lower end and an upper end, said shaft pivotally mounted at said lower end for pivotal movement about an axis parallel to said flat base and orthogonal to the axis of said elongated shaft at a pivot point on said flat base adjacent a front edge of said flat base, said elongated shaft having an extensible upper shaft section such that said elongated shaft is adjustable in length, said elongated shaft inclined towards a back edge of said flat base at an adjustable angle with respect to said flat base;
   means for clamping said extensible upper shaft section in different extended positions;
   angular indicator means including a marker and an angular indicia scale to indicate said adjustable angle;
   a toe plate slidably mounted on said flat base to indicate the position of said particular golfer's feet on said flat base; and
   a linearly graduated scale for measuring the distance between said toe plate and said pivot point.

2. Apparatus as in claim 1 wherein said toe plate includes a handle extending through said flat base in an elongated slot formed in said flat base, said handle extending under said flat base and protruding beyond said back edge for adjusting the position of said toe plate, said linear graduated scale marked on said handle, said slot disposed generally transverse to said front and back edges in the plane of said elongated shaft.

3. Apparatus as in claim 1 wherein elongated shaft comprises a tubular two-section telescoping shaft with the upper portion of a lower shaft section slidably fitted into the lower portion of said upper shaft section and protruding therefrom, said lower shaft section including a linearly graduated scale marked thereon to indicate the length of said elongated shaft.

4. Apparatus as in claim 4 wherein said clamping means comprises an internally threaded nut slidably mounted on said lower shaft section, the lower end of the lower portion of said upper shaft section externally threaded and bevelled with a plurality of narrow slots formed therein, such that when said nut is threadedly engaged with and tightened on the lower end of said lower portion, said lower end of said lower portion is compressed against the lower shaft section to securely hold said upper shaft section in a selected position.

5. Apparatus as in claim 1 wherein said angular indicator means comprises a plate rigidly mounted to said flat base at said pivot point having a pivot bolt therethrough to pivotally connect said elongated shaft to said plate at said pivot point, the lower end of said lower shaft section having a hairline marked thereon in alignment with the axis of said elongated shaft, one side of said plate having said angular indicia marked thereon for use with said hairline to indicate said angle formed by the axis of said elongated shaft and said flat base.

6. Apparatus as in claim 1 wherein said flat base comprises a generally rectangular flat surface supported by a frame having short adjustable legs at each corner thereof to level said flat base.

7. Apparatus for measuring and fitting a golf club to an individual golfer comprising:
   a flat generally rectangular base plate supported by a rigid frame having leveling means at each corner thereof;
   a semicircular plate vertically oriented in a plane generally orthogonal to a front edge of said base plate and rigidly mounted at its flat edge on said base plate adjacent said front edge;
   an elongated tubular shaft having a lower end and upper end, said elongated shaft having an extensible upper shaft section slidably connected to said upper end to accommodate adjusting the length of said elongated shaft to a selected length said elongated shaft includes a hand tightened nut disposed at the connection between said elongated shaft and said upper shaft section to maintain said upper shaft section at different selected positions relative to said elongated shaft, said elongated shaft pivotally connected to said semicircular plate at a pivot point for pivot movement about an axis generally orthogonal to the axis of said elongated shaft, said elongated shaft inclined at an adjustable and selectable angle generally towards a back edge of said base plate, said elongated shaft having a linear scale marked thereon for measuring the length thereof;

said semicircular plate having angular indicia marked thereon along at least a portion of its upper semicircular edge, said elongated shaft including an indicator at said lower end aligned with the axis of said elongated shaft for use with said angular indicia for measuring the angle defined by the axis of said elongated shaft and said base plate;

a toe plate slidably mounted on said base plate, in an elongated slot extending generally transverse to said front and back edges and aligned with said semicircular plate, said toe plate including a handle extending through said slot and under said base plate parallel to said base plate and protruding through an opening in said frame at said back side, said handle for slidably adjusting the position of said toe plate in said slot relative to said semicircular plate;

measuring means for measuring the distance between said pivot point and said toe plate.

8. Apparatus as in claim 8 wherein said measuring means comprises a linear scale marked on the portion of said handle protruding from said frame for indicating the distance between said toe plate and said pivot point.

9. A method of fitting a golf club to an individual golfer comprising the steps of:
  (a) measuring the lie angle, shaft length, and address distance associated with the normal address stance of said golfer;
  (b) defining an address fitting constant which is equal to the differences between the measured address distance and the product of the measured shaft length and the cosine of the measured lie angle;
  (c) defining a hand height reference distance which is equal to the product of the measured shaft length and the sine of the measured lie angle;
  (d) marking a new address distance on a club which is equal to the address fitting constant added to the quotient of the hand height reference distance divided by the tangent of the effective lie angle of said club;
  (e) repeating step (d) for any number of the golf clubs of a given set.

* * * * *